Patented Feb. 11, 1941

2,231,860

UNITED STATES PATENT OFFICE 2,231,860

PHENOL-BUTYRALDEHYDE-FORMALDE-
HYDE RESINS

Lloyd C. Swallen, Pekin, Ill., assignor, by mesne
assignments, to Monsanto Chemical Company,
St. Louis, Mo., a corporation of Delaware No Drawing. Application September 27, 1937,
Serial No. 165,905

6 Claims. (Cl. 260—53)

My invention relates to synthetic resins prepared from butyraldehyde, phenol, and formaldehyde, and more particularly to oil-soluble resins produced from butyraldehyde, phenol, and formaldehyde.

It has previously been known that resinous materials could be obtained by reacting butyraldehyde, phenol, and formaldehyde. Schrimpe (United States Patent No. 1,667,872) reacted 0.85 mole butyraldehyde with one mole phenol in the presence of 1% to 3% hydrochloric acid until the characteristic butyraldehyde odor was no longer evident. After removal of water, unreacted phenol and butyraldehyde, the resulting fusible, soluble resin was reacted with formaldehyde or other methylene-containing compound to give a hard, infusible, insoluble resin.

I have now found that by modifying the reaction conditions and the proportions of reactants entirely different types of resins may be produced from these same initial raw materials. In accordance with my invention improved resins having an excellent degree of oil solubility may be produced which are suitable for use in the manufacture of varnishes, enamels, compositions for impregnating paper, wood, and similar materials, and for other known uses of oil soluble resins.

In accordance with my invention the butyraldehyde and phenol are first reacted in a molecular proportion of 0.5 to 0.8 mole of aldehyde per mole of phenol, and the resulting intermediate product is then reacted with from 3.0 to 8.0% by weight of formaldehyde (dry basis). By employing these ratios of reactants in both stages of the reaction, products of satisfactory oil solubility may be produced which have other desirable properties for varnish resins such as hardness, alkali resistance, and the like.

In effecting the first stage of the reaction the butyraldehyde and phenol are reacted at an elevated temperature for a period of hours in the presence of a condensation catalyst. The reaction may suitably be carried out at the reflux temperature of the mixture and either acid or alkaline condensation catalysts may be employed. The use of an acid catalyst will usually be advantageous from the standpoint of shorter reaction time but will produce a relatively dark colored intermediate product. By employing the reaction conditions disclosed in copending application Serial No. 165,893 of W. J. Bannister, filed Sept. 27, 1937, light colored intermediate products may be produced with the resulting production of light colored final products in my process. These reaction conditions comprise the use of an alkaline catalyst and a non-oxidizing atmosphere in the reaction vessel. With the use of either acid or alkaline catalyst the course of the reaction may be followed by determining the melting point of the intermediate product, and at the conclusion of the reaction the catalyst may be neutralized and the resulting salt removed by washing. Any unreacted butyraldehyde or phenol may then be removed by steam distillation.

The intermediate product obtained as above described is next reacted with from 3.0% to 8.0% by weight of formaldehyde (dry basis). The exact proportion of formaldehyde to be employed will depend to some extent on the nature of the intermediate product, and should in any case be slightly less than the amount which will cause the material to gel in the final reaction. In general, I prefer to utilize approximately 5% by weight of formaldehyde (dry basis) with an intermediate product prepared with an alkaline catalyst, and approximately 6.0% to 6.5% of formaldehyde with an intermediate product prepared with an acid catalyst. The exact optimum proportion for any particular case may be readily determined by preliminary experiments.

The reaction between the intermediate product and the formaldehyde is effected by heating these materials either in the presence or absence of a condensation catalyst. If an aqueous solution of formaldehyde is employed the reaction may suitably be carried out at the reflux temperature of the mixture, or if paraform is employed the reaction may be effected at temperatures of 100 to 140° C. The course of the reaction may be followed by determining the melting point of the resin produced, which will reach a maximum at the conclusion of the reaction. The melting point of the resin may range from about 80° C. to about 120° C. depending upon the proportion of the reactants, but preferably should approximate 100° C. for the production of varnish resins.

My invention may be illustrated by the following specific examples:

*Example I*

A mixture of 188 parts by weight of phenol and 86 parts by weight of butyraldehyde together with 2 parts by weight of concentrated hydrochloric acid was heated under a reflux condenser until reaction was complete. The hydrochloric acid was then neutralized by the addition of sodium hydroxide solution and the resulting sodium chloride was removed by washing. The product thus obtained was steam distilled at an elevated temperature to remove unreacted materials and a brown brittle resin was thus obtained. To this was added 15 parts by weight of paraform and 2.5 parts by weight of oxalic acid, and the resulting mixture was heated for a period of approximately 3½ hours at a temperature slightly above 100° C., at the end of which time the resin had reached a maximum melting point. The material was then rapidly subjected to a temperature of approximately 200° C. to remove water of reaction and any other volatile materials present.

*Example II*

A mixture of 188 parts by weight of phenol, 100 parts of butyraldehyde, and 9.4 parts of sodium hydroxide was refluxed in an atmosphere of nitrogen for a period of approximately 21 hours. To the reaction mixture thus obtained 130 parts by weight of benzol was added, and the sodium hydroxide in the resulting solution was neutralized by the addition of sufficient hydrochloric acid to make the mixture slightly acid to Congo red paper. The product was then washed with water until neutral and steam distilled at an elevated temperature to remove unreacted materials. A yield of 117 parts by weight of the intermediate reaction product was thus obtained. To this was then added 23 parts by weight of 37% formaldehyde solution, and the resulting mixture refluxed for a period of approximately 3½ hours at a temperature slightly above 100° C., at the end of which time the resin had reached a maximum melting point. The material was then subjected to vacuum distillation to remove water of reaction and any other volatile materials.

The resins obtained as above described are readily soluble in drying oils and in mixtures of drying oils and the common varnish diluents. The product of Example I is suitable for use in dark varnishes and enamels, and the product of Example II is suitable for use in lighter colored coating materials. These resins may be employed in any of the usual compositions in which oil-soluble resins are utilized and are particularly adapted for use in alkali resistant finishes. The coating materials employing the resins of the present invention may be formulated in accordance with known practices, and any of the common ingredients of such compositions may be utilized in conjunction with these resins.

It will be understood, of course, that the above examples are merely illustrative and do not limit the scope of my invention. The procedures employed may be modified in various respects. In the first stage of the reaction other condensation catalysts may be employed in place of those specified in the examples, e. g., phosphoric acid, potassium hydroxide, calcium hydroxide, etc., and other ratios of butyraldehyde to phenol may be utilized within the range of molar ratio 0.5 to 0.8, previously specified. In the second step of the process different ratios of reactants may be employed within the range previously discussed. An excess of formaldehyde may be employed if care is taken to remove the excess before the reaction proceeds to an undesirable degree. The reaction at this stage of the process may be carried out either with or without a condensation catalyst, and various other catalysts of this nature may be substituted for the oxalic acid specified in Example I. It is to be understood that the use of all such equivalents and any modifications of procedure which would naturally occur to one skilled in the art are included within the scope of my invention.

My invention now having been described, what I claim is:

1. A process for the production of an oil-soluble synthetic resin which consists in reacting in the presence of a condensation catalyst butyraldehyde and phenol in a ratio of 0.5 to 0.8 mole of butyraldehyde per mole of phenol, and further reacting in the presence of an acid condensation catalyst the condensation product thus obtained with from 3% to 8% by weight of one of the group consisting of formaldehyde (dry basis) and paraform.

2. A process for the production of an oil-soluble synthetic resin which consists in reacting in the presence of a condensation catalyst butyraldehyde and phenol in a ratio of 0.5 to 0.8 mole of butyraldehyde per mole of phenol and further reacting in the presence of an oxalic acid condensation catalyst the condensation product thus obtained with from 3.0% to 8.0% by weight of one of the group consisting of formaldehyde (dry basis) and paraform.

3. A process for the production of an oil-soluble synthetic resin which consists in reacting in the presence of a condensation catalyst butyraldehyde and phenol in a ratio of 0.5 to 0.8 mole of butyraldehyde per mole of phenol and further reacting in the presence of an acid condensation catalyst the condensation product thus obtained with from 5.0% to 6.5% by weight of one of the group consisting of formaldehyde (dry basis) and paraform.

4. A process for the production of an oil-soluble synthetic resin which consists in reacting in the presence of a condensation catalyst butyraldehyde and phenol in a ratio of 0.5 to 0.8 mole of butyraldehyde per mole of phenol and further reacting in the presence of an oxalic acid condensation catalyst the condensation product thus obtained with from 5.0% to 6.5% by weight of formaldehyde (dry basis).

5. An oil-soluble synthetic resin prepared according to the process of claim 1, said resin being characterized by fusibility and alkali resistance.

6. An oil-soluble synthetic resin prepared according to the process of claim 4, said resin being characterized by fusibility and alkali resistance.

LLOYD C. SWALLEN.